March 28, 1933.   W. H. PAULSON   1,903,193
MILK DUMPING DEVICE
Filed Dec. 13, 1929   3 Sheets-Sheet 2

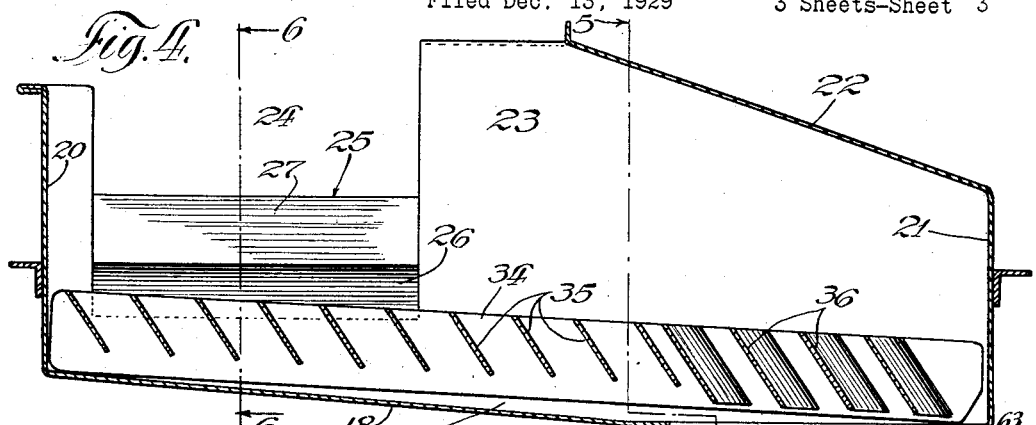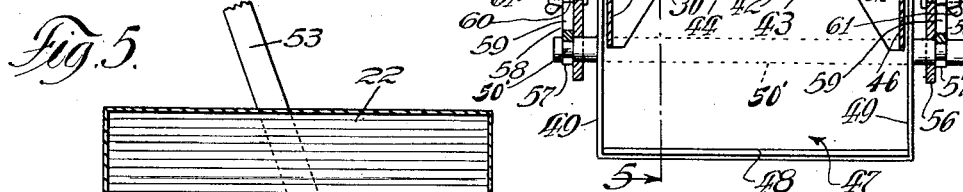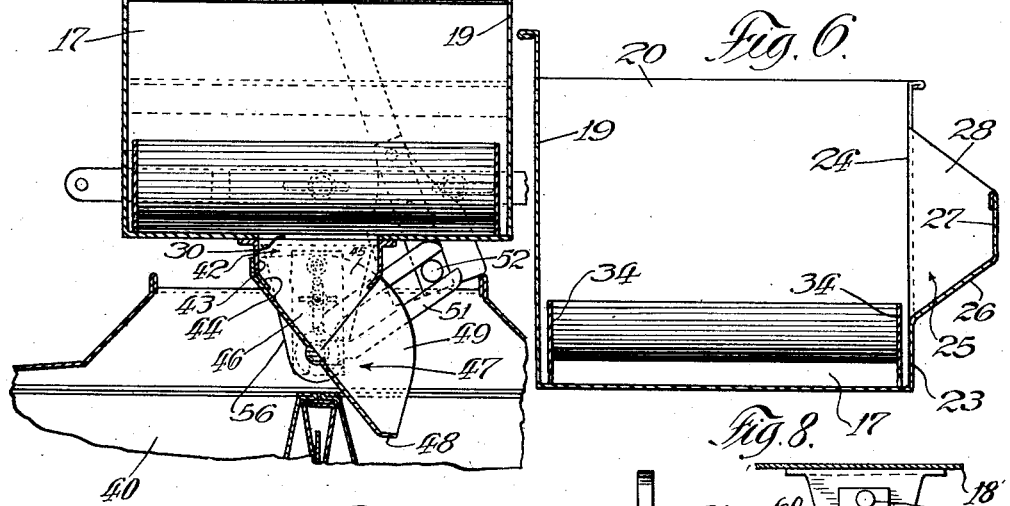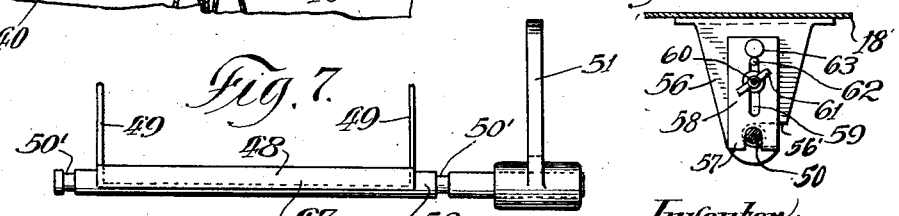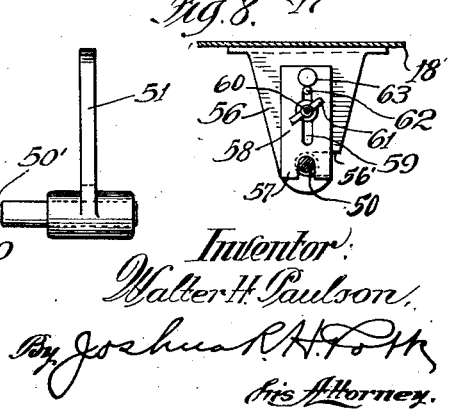

Patented Mar. 28, 1933

1,903,193

UNITED STATES PATENT OFFICE

WALTER H. PAULSON, OF CHICAGO, ILLINOIS, ASSIGNOR TO HARRY D. LATHROP, OF CHICAGO, ILLINOIS

MILK DUMPING DEVICE

Application filed December 13, 1929. Serial No. 413,796.

This invention relates to dairy machinery, and more particularly to that part of the apparatus where the milk as received in the original cans or containers from the producers is dumped and delivered into the tank or receptacle where it receives its initial treatment in the regular course through which it is to pass to be variously treated and prepared for consumption and use.

As above stated, the present invention has more particularly to do with the removal of the milk from the original containers as they are received at the plant. The particular mechanism for accomplishing this is usually located at the terminus of a conveyor from the receiving and unloading platform and at the starting end portion of a can washing machine. This milk dumping mechanism is also located in cooperative relation to a receiving and distributing tank or container. The principal object of the invention, therefore, is to produce a simple, compact and practical means for dumping and distributing the milk so that a minimum of space is utilized in the installation of the entire plant apparatus for the treatment of the milk; to facilitate the handling and weighing of the respective milk consignments from each consignor, rapidly and with a relatively small number of laborers; and to attain certain advantages which will hereinafter more fully appear.

The invention consists in the novel structural arrangements and in the several parts and combinations and arrangements of parts hereinafter described and pointed out with particularity in the appended claims.

In the accompanying drawings, forming part of this specification and illustrating a practical adaptation of the invention,—

Fig. 4 is a fragmentary section, on an enlarged scale, through the receiving hopper and delivery device of the dumping mechanism;

Fig. 5 is a section taken substantially on the line 5—5 of Fig. 4;

Fig. 6 is a section on the line 6—6 of Fig. 4;

Fig. 7 is a detail view, in end elevation, of the reversible deflecting member of the delivery device;

Fig. 8 is a fragmentary view illustrating details of the releasable latch device for retaining the reversible deflecting member of the delivery device in place; and Fig. 9 is a fragmentary horizontal section through the receiving hopper portion of the machine, illustrating the arrangement of the baffle grid frame on the bottom of the hopper.

Figure 1:
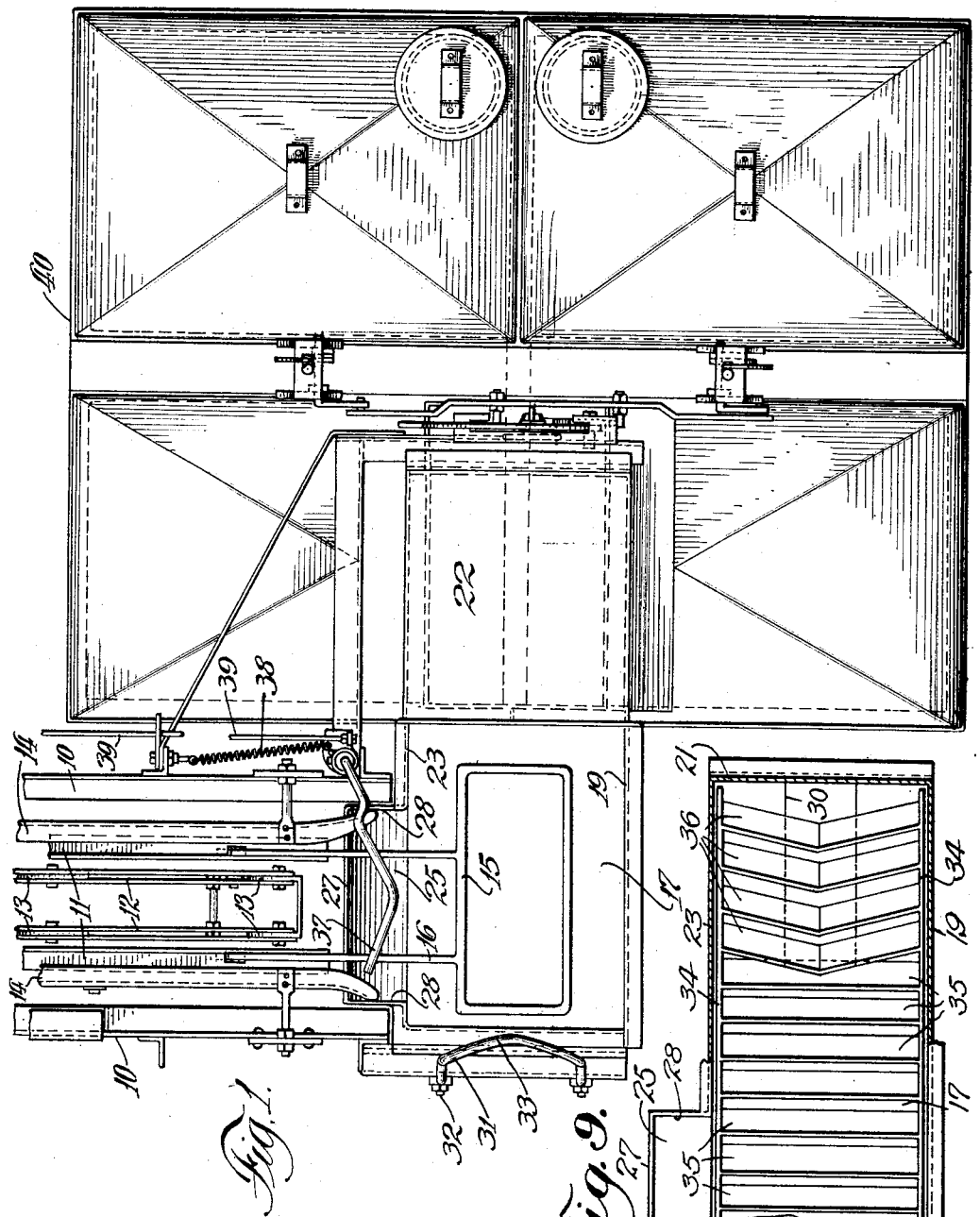
Fig. 1 is a top plan view of the dumping mechanism in connection with a fragment of the adjacent end portion of the can washing mechanism and the receiving receptacle of the weighing and distributing means.
Figure 2:
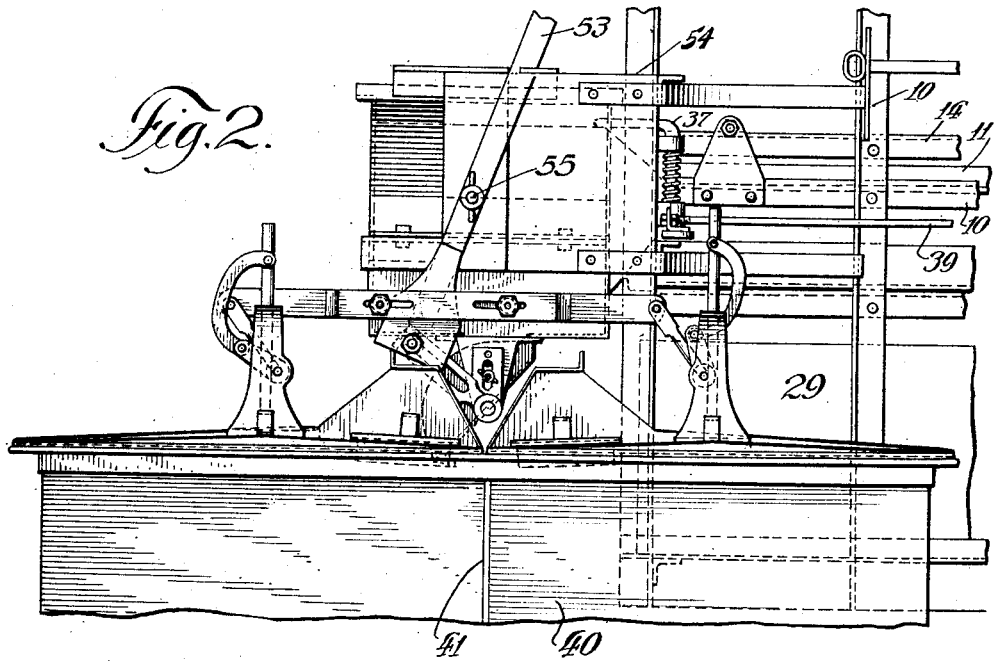
Fig. 2 is a front elevation of the parts shown in Fig. 1.
Figure 3:
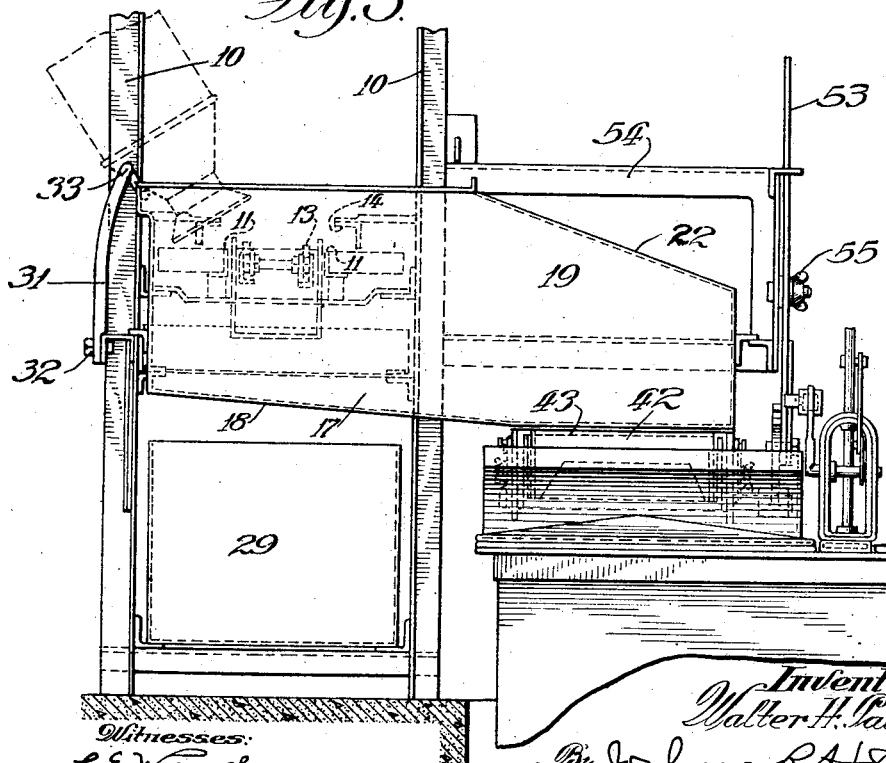
Fig. 3 is a side elevation of said parts.

Referring now to the drawings, the numeral 10 designates generally the framework at the receiving end of an ordinary can washing machine. The particular machine illustrated is of the straightaway type, in which the empty milk cans are placed at the receiving end, usually in inverted position on a longitudinal trackway, along which latter the cans are conveyed and subjected at intervals throughout the length of the machine to the several washing, rinsing, sterilizing and drying operations, and finally discharged at the delivery end of the machine.

As shown, the trackway comprises a pair of parallel longitudinal rails 11 on which the usual flared mouthpieces of the inverted cans are seated to be successively engaged by either an endless belt or a reciprocatory feeding device, as the case may be, said feeding device, as shown, being of the reciprocatory frame type and carrying the usual can engaging pawls or dogs. In the illustration this feeding frame is designated by the numeral 12, and the respective pawls by the numeral 13. Arranged above the trackway 11 is the can guide comprising the parallel longitudinal members 14 which are usually L-shaped in cross-section, and whose inwardly disposed horizontal flanges overhang the flared mouth portions of the inverted cans on the trackway.

At the receiving end of the can washing machine is a rack comprising an open rectangular frame 15 which is provided with a pair of parallel arms or bracket extensions 16, said bracket extensions being supported on the frame so as to constitute, in effect, forward extensions of said trackway members 11. The rack frame 15 overhangs a hopper 17 having an inclined bottom 18, continuous side wall 19, a relatively high wall 20 at the receiving end of said hopper, a comparatively lower wall 21 at the discharge end thereof, and a cover plate or hood 22 over the discharge end portion. The side wall 23 opposite the wall 19 has an opening 24 in the region of the receiving portion of the can washing machine, said opening 24 being in full communication with a trough-like extension 25, said portion 25 having an inclined bottom 26, low side wall 27 and marginally tapered end walls 28. This trough-like extension underlies the trackway at the receiving end of the machine and overhangs a supplemental receptacle 29 which extends somewhat farther under the trackway. In the bottom 18 of the hopper 17, at the middle thereof and adjacent to the end wall 21, is a rectangular discharge opening 30, the details of which together with the associated cooperating parts, will be later herein described.

In practice, the milk in the original cans from the consignor is delivered by means of a conveyor or other medium (not shown) in convenient proximity to the hopper 17. The respective cans are lifted in turn, either by the hand of a laborer or some mechanical means, and inverted on the rack frame 15. Preferably, a tippling rack 31 is mounted on the frame of the machine adjacent to the end wall 20 of the hopper, this rack, as shown, comprising an inverted substantially U-shaped device bolted at its ends, as at 32, to the frame of the machine and having its middle portion 33 bent towards the hopper 17 so as to afford a saddle-like support for the can during the dumping manipulation thereof. In the lower portion of the hopper 17 is a grill comprising the longitudinal side bars or rails 34, the plain flat inclined slat-like cross members 35 for the major portion of its length from the receiving end of the hopper, and the wider, substantially V-shaped, cross members 36 at the discharge end of the hopper. By the provision of this slatted frame or grill in the bottom portion of the hopper. the milk deposited in the hopper is checked from flowing too rapidly and gorging at the discharge end of the hopper, and at the same time the bulk of the milk is agitated to a considerable extent so as to assure a thorough mixing of its constituent elements. In this connection, also, it is here noted that the hood portion 22 serves as a guard to prevent the overflow of the milk at the discharge end of the hopper, while the said slatted frame or grill prevents the discharging of the milk through the opening 30 with a swirling motion.

After the can has been practically emptied of its contents and still is in its inverted position on the rack 15, it is moved by hand onto the track extension 16 of said rack. Disposed normally above and across the track extension 16, in the path of the can, is an actuator arm 37 which is engaged by the can and swung out of the way as the can is moved farther along said track extension by the operator. After the can has passed clear of said arm 37 a spring 38 acts to retract the arm and restore it to normal position to be engaged by the next succeeding can. This actuator arm 37 is connected to a rod 39 which is a part of the controlling means for the can feeding mechanism of the washing machine, whereby the travel of the cans proceeds step by step as a new can is placed in the machine.

As the can is moved from the rack 15 onto the track extension 16 and thence onto the trackway proper, the first drippings from the can are caught in the trough-like extension 25 and thereby drained into the hopper 17, and all drippings after the can has passed out of range of said trough-like extension are caught in the supplemental receptacle 29. In this way there is no appreciable wastage of the milk as the first drippings, as above set forth, are conducted into the hopper with the main bulk of the milk, the residue in the supplemental receptacle 29 being separated from the main bulk so as to be recovered and utilized to some commercial advantage. In practice, said supplemental receptacle 29 will, in practically all cases, obviously extend to the vicinity where the first cleansing operation takes place in the machine.

From the dumping device the milk is delivered into the receiving and distributing tank or receptacle where the first tests and weighing or measuring of the milk to determine its quantity occurs. Preferably, this receptacle or container, designated in the drawings by the numeral 40, may be termed the weigh tank, and in the usual installation said tank is divided by a central partition 41 into two compartments, into one of which is delivered the milk from one consignor and into the other the milk of another consignor. An important feature of the invention resides in provision for directing the milk to either side of the partition 41 of the tank or receptacle 40 as the milk is discharged from the hopper 17. This facilitates handling the milk expeditiously, and thus avoids or at least minimizes any loss of time in the handling and measuring of the milk from two separate consignors. In this connection, the discharge opening 30 is preferably provided with a depending marginal flange or boxing 42, whose longitudinal side walls 43 have inturned angular marginal flanges 44, and whose end walls 45 have tapered or wedgelike extensions 46. Cooperating with said boxing 42 is a rocking valve element or deflector 47 comprising a substantially rectangular plate-like body portion, at the opposite side margins of which are angular flanges 48, said member 47 having segmental end walls 49, which latter overlap the end walls 45 of the boxing 42, and in either of the operative positions of said member 47, its angular marginal portions 48 engage the corresponding adjacent side wall 43 of said boxing 42.

The valve member or deflector 47 is mounted medially on an axle or rock shaft, which latter is journaled in brackets provided therefor and depending from the under side of the hopper 17, the details of which latter will presently be described. The axle or rock shaft 50 is provided with a bifurcated or slotted lever arm 51 which is engaged by a stud or roller 52 on the end of an actuating lever 53, which latter is pivotally mounted on a supporting frame 54, as at 55, at a point adjacent to the end of said hopper 17. By this arrangement, the rocking of the operating lever 53 effects a corresponding oscillation of the valve member or deflector 47 so that the latter is shifted about its axis to thereby deflect the milk to either side of the division wall or partition 41 of the tank or receptacle 40. It will thus be seen that the milk from one producer or consignor may be dumped into the hopper 17 and directed into one of the compartments of the weigh tank 40, and, after a sample has been taken for test purposes and the milk otherwise checked or preliminarily treated in the usual way, the milk from another producer or consignor may be dumped and diverted into the opposite compartment of said weigh tank 40 while the milk of the first producer is being drained from said first mentioned compartment.

The actuating lever 53, in addition to operating the valve element or deflector 47 as herein above described, further functions, through suitable connections, to operate the outlet controlling valves of the weigh tank 40. This feature constitutes a part of the subject-matter of a separate application for patent and, therefore, is not herein set forth in detail. However, there are certain details in connection with the valve element or deflector 47 which do enter into the present invention, and will now be described. In this connection it is noted that the axle member or rock shaft 50 is journaled in brackets 56 depending from the under side of the hopper 17. As shown, said bracket members 56 have laterally notched bearing openings in their lower end portions in which the shaft 50 is rotatably fitted, said shaft having annular grooves 50' therein, said grooved portions being engaged by the bifurcated end portions 57 of latch members 58, which latter are vertically adjustable by having longitudinally slotted portions 59 through which studs 60 are projected from the bracket members 56, and wing nuts 61 being provided on said studs 60 for the purpose of clamping the latch members 58 securely in position. A second stud 62 is provided on each of the bracket members 56 so as to project into the slots 59 of the latch members 58, whereby to support said latch members when the wing nuts 61 are loosened, said studs 62, in conjunction with the studs 60, also maintaining the latch members with their bifurcated end portions 57 in alinement with the bearing portions in said brackets 56 for the shaft 50. Preferably, the latch members 58 are provided with knobs 63 for convenience in lifting said latch members so that the bifurcated end portions 57 will clear the annularly grooved portions 50' of said shaft 50. By this arrangement, the valve element or deflector 47 may be quickly attached and detached at will.

Obviously, the device admits of considerable modification structurally without in the least departing from the spirit and scope of the invention as defined by the appended claims. The invention, therefore, is not limited to the specific construction and arrangement shown in the accompanying drawings.

Having thus described my invention, what I claim as new and desire to secure by Letters Patent is:

1. The herein described milk handling device comprising a receiving hopper having an inclined bottom provided with an outlet opening at the lower end thereof, a flow-checking baffle in said hopper adjacent to the bottom thereof, and a reversible deflector arranged cooperatively beneath the outlet opening of said hopper, whereby to direct the milk discharged through said outlet opening to either side of a median line with respect thereto.

2. The herein described milk handling device comprising a receiving hopper having an inclined bottom and a hooded forward end portion and being provided with an outlet opening in its bottom beneath said hooded portion, a flow-checking baffle comprising a grill including inclined transverse slats, adjacent to the bottom of said hopper and extending across the outlet opening thereof, and a deflector pivotally mounted medially below said outlet opening, whereby to be reversely operated so as to direct the milk discharged from the latter to either side of a median line.

3. In a milk dumping device, a receiving hopper having an inclined bottom provided with a central longitudinally elongated rectangular discharge opening in its lower end portion, said opening being surrounded by a depending boxing, and an external reversible tilting deflector cooperatively arranged beneath said boxing and having marginally flanged portions overlapping said depending boxing of the hopper, the pivotal axis of said deflector being in a median longitudinal vertical plane with respect to said boxing, whereby to direct the milk discharged from said hopper to either side of said median plane at will.

4. In a milk dumping device, a receiving hopper having rectangular discharge opening in its bottom, a depending open-bottom boxing surrounding said discharge opening, the marginal portions of the longitudinal walls of said boxing being angular and disposed inwardly, and the end walls thereof having downward tapering extensions, the apexes of said extensions being coincident with the median longitudinal vertical plane with respect to said boxing, and a tiltable deflector comprising a plate-like body portion having angular longitudinal marginal flanges and segmental perpendicular end extensions, the longitudinal marginal portions of said deflector cooperating with the respective side walls of said boxing and the segmental end portions of said deflector cooperating respectively with the adjacent end walls of said boxing, the pivotal axis of said deflector being in a median longitudinal plane with respect to itself and coincident with the median longitudinal plane of said boxing.

5. In a milk dumping device, a receiving hopper having a rectangular discharge opening in its bottom, a depending open-bottom boxing surrounding said discharge opening, the marginal portions of the longitudinal walls of said boxing being angular and disposed inwardly, and the end walls thereof having downward tapering extensions, the apexes of said extensions being coincident with the median longitudinal vertical plane with respect to said boxing, bracket members adjacent to the opposite ends of said boxing, and a tiltable deflector detachably mounted on said bracket members, said deflector including a rock shaft whose axis coincides with the median longitudinal vertical plane of the apexes of the end walls of said boxing, and a body plate secured to said rock shaft and extending equally on opposite sides of the axis thereof, the longitudinal marginal portions of said plate being flanged angularly and cooperating respectively with the adjacent side wall portions of said boxing, said plate having perpendicular segmental end extensions cooperating respectively with the adjacent end walls of said boxing.

6. In a milk dumping device, a receiving hopper having a rectangular discharge opening in its bottom, a depending open-bottom boxing surrounding said discharge opening, the marginal portions of the longitudinal walls of said boxing being angular and disposed inwardly, and the end walls thereof having downward tapering extensions, the apexes of said extensions being coincident with the median longitudinal vertical plane with respect to said boxing, bracket members adjacent to the opposite ends of said boxing, a tiltable deflector detachably mounted on said bracket members, said deflector including a rock shaft whose axis coincides with the median longitudinal vertical plane of the apexes of the end walls of said boxing, and a body plate secured to said rock shaft and extending equally on opposite sides of the axis thereof, the longitudinal marginal portions of said plate being flanged angularly and cooperating respectively with the adjacent side wall portions of said boxing, said plate having perpendicular segmental end extensions cooperating respectively with the adjacent end walls of said boxing, a lever arm on said rock shaft, and an actuating lever having an operable connection with said lever arm whereby said deflector may be actuated at will to direct the milk discharged from said hopper to either side of the median longitudinal vertical plane of said boxing surrounding the outlet opening of said hopper.

7. In an apparatus of the character described, a receiving hopper having a portion provided with a discharge opening in its bottom, a can dumping rack on said hopper, a second rack within said hopper to receive the inverted can from said dumping rack, a lateral trackway from said second named rack, a drippings receiver correlated to said lateral trackway and communicating with said hopper, whereby to deliver the drippings from the can to the hopper, baffle means in said hopper adjacent to the bottom thereof for interrupting the direct flow of the milk therethrough, and a reversible tilting deflector element beneath the discharge opening of said hopper, the pivotal axis of said deflector element being in a median longitudinal vertical plane with respect to said discharge opening, whereby to direct the milk discharged from said hopper, at will, to either side of the pivotal axis of said deflector element.

8. In an apparatus of the character described, a milk dumping device comprising a substantially rectangular receiving hopper having an inclined bottom terminating with a horizontal lower end portion overhanging a distribution receptacle, said overhanging lower bottom portion of the hopper having a discharge opening therein and said distribution receptacle having a partition wall coinciding with the median longitudinal vertical plane of said discharge opening of the hopper, a tiltable deflector interposed between said hopper and said distribution receptacle, the pivotal axis of said deflector coinciding with the median longitudinal vertical plane of said discharge opening and said partition wall, a can dumping rack on said hopper, a can receiving rack within said hopper, a lateral trackway leading from said last named rack through an opening provided therefor in the contiguous wall of the hopper, and a drippings receiving extension on said hopper coincident with said opening in the wall thereof and in correlation to said lateral trackway, whereby to deliver the drippings from the cans into said hopper.

9. The herein described milk handling device comprising a receiving hopper having an outlet opening in its bottom, bracket members depending from the underside of said hopper and on opposite sides of said outlet opening, said bracket members having laterally entrant bearing portions in axial alinement and with the axis coincident with the median vertical plane of said outlet opening, latch elements cooperable with said bearing portions, and a reversible deflector cooperative with said outlet opening whereby to direct the discharge from said hopper to either side of said median plane of said outlet opening, said deflector having journal portions at its opposite ends, said journal portions being inserted in said laterally entrant bearing portions of said bracket members and being releasably but retentively engaged by said latch elements.

10. The herein described milk handling device comprising a receiving hopper having an outlet opening in its bottom, bracket members depending from the underside of said hopper on opposite sides of said outlet opening, said bracket members having laterally entrant bearing openings, reciprocatory latch elements having bifurcated end portions in cooperative relation to said bearing openings, and a deflector associated with said outlet opening whereby to direct the discharge therefrom to either side of the median plane of said opening, said deflector having journal portions at its opposite ends and adapted to be received in said bearing openings of said bracket members, said journal portions being annularly grooved whereby to receive the bifurcated end portions of said latch elements.

11. The herein described milk handling device, comprising a substantially rectangular hopper having an inclined bottom provided with an outlet opening in its lower end portion, and a baffle comprising a grid frame having transverse slats located adjacent to, but with their lower edge portions spaced throughout the entire length thereof from, the bottom of said hopper.

12. The herein described milk handling device, comprising a substantially rectangular hopper having an inclined bottom provided with an outlet opening in its lower end portion, and a baffle comprising a grid frame having transverse slats located adjacent to, but with their lower edge portions spaced from, the bottom of said hopper, said grid frame extending over the outlet opening and the lower edge portions of the transverse slats in the region of said opening terminating closer to the bottom of the hopper than the other slats.

13. The herein described milk handling device, comprising a substantially rectangular hopper having an inclined bottom provided with an outlet opening in the lower end portion thereof, and a baffle comprising a longitudinally extending grid frame superposed above the bottom of the hopper and having forwardly and downwardly inclined transverse slats located adjacent to, but having their lower edges spaced throughout the entire length thereof from, the bottom of the hopper.

14. The herein described milk handling device comprising a substantially rectangular hopper having an inclined bottom provided with an outlet opening in the lower end portion thereof, and a baffle comprising a grid frame having forwardly and downwardly inclined transverse slats located adjacent to, but having their lower edges spaced from, the bottom of the hopper, said grid frame extending over said outlet opening, the slats above said opening terminating with their lower edge portions closer to the bottom of the hopper than the other slats and being substantially V-shaped in top plan, but said other slats being plain flat.

15. Milk handling means comprising, in combination, a receptacle having adjoining compartments separated by a partition wall, and a receiving hopper located in a plane above said receptacle, said hopper having a discharge opening in its bottom, said opening being disposed above said receptacle and equally on opposite sides of the median plane of said partition wall, and a tiltably reversible deflector comprising a marginally flanged plate-like element pivotally mounted externally of said hopper and medially below said outlet opening thereof, the flanged marginal portions of said deflector overlapping the marginal portions of the hopper surrounding the discharge opening, and the pivotal axis of said deflector coinciding with the vertical plane of the partition wall of said receptacle beneath.

In testimony whereof I have signed my name to this specification.

WALTER H. PAULSON.